3,423,200
2-TRICHLOROMETHYLBENZOXAZOLE AS A HERBICIDE
George Holan, Brighton, Victoria, Australia, assignor to Monsanto Chemicals (Australia) Limited, West Footscray, Victoria, Australia, a company of Victoria, Australia
No Drawing. Filed Dec. 16, 1965, Ser. No. 526,643
Claims priority, application Australia, Dec. 18, 1964, 53,084/64
U.S. Cl. 71—88      5 Claims
Int. Cl. A01n 5/00, 9/22

ABSTRACT OF THE DISCLOSURE

Herbicidal compositions comprising 2-trichloromethylbenzoxazole.

---

This invention relates to herbicidal compositions and methods for controlling or destroying undesired vegetation, the invention being based upon the discovery that 2-trichloromethylbenzoxazole, which has the structural formula:

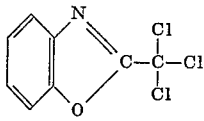

possesses heribicidal activity and is useful as a pre-emergent weed-killer against both grasses and broad leaf plants. The specified compound is particularly effective against grasses.

The method of the invention consists in contacting soil containing pre-emergent undesired vegetation, or, contacting undesired post-emergent vegetation, with a herbicidally effective amount of 2-trichloromethylbenzoxazole. The method of the invention can be carried out by applying herbicidal compositions embodying 2-trichloromethylbenzoxazole, as the essential herbicidal component, in suitable concentrations for the purpose, such herbicidal compositions generally containing from about 0.5% to about 95% by weight of the active compound. These herbicidal compositions or formulations can be prepared by admixing the active compound or a mixture of such compounds with an inert carrier or diluent material, the resultant compositions being ready for application to soil containing undesired pre-emergent or post-emergent vegetation, using conventional equipment for the purpose. Thus, the herbicidal compositions or formulations can be prepared in the form of solids or liquids.

Solid compositions may be prepared in the form of ready-to-use compositions, such as dust mixtures prepared by admixing the active material with finely-divided inert carriers to give a homogeneous free-flowing composition suitable for direct application to soil or plants. The finely-divided inert carrier may be chosen from such materials as talc, clay, bentonite, pumice, fuller's earth, pyrophyllite and diatomaceous earth, or flours such as walnut shell, wheat, redwood, soya bean, cottonseed, or other inert dust materials conventionally employed in preparing herbicidal compositions in powder form. Alternatively, the active compound may be applied as a solution in a suitable organic solvent such as kerosene, xylene, toluene and other aromatic petroleum solvents. The ready-to-use dusts and solutions may contain from about 90 to 98% by weight of inert diluent or solvent.

The active material can also be formulated as a concentrate composition, suitable for dilution with water, before application to soil or plants. Such formulations may be in the form of finely-divided solids which disperse in water to give finely-divided stable suspensions, or they may be in the form of liquid compositions consisting of active material in a water-miscible organic solvent carrier which can be easily emulsified in water to form a stable emulsion. The former is a water-dispersible powder concentrate, whilst the latter is a water-emulsifiable concentrate. Both types of concentrate may contain from about 10% to about 90% of active material depending on the nature of the application and the activity of the herbicidal compound. Such herbicidal concentrates may also contain organic surface active agents of the kind sometimes referred to in the art as wetting, dispersing or emulsifying agents. These surface active agents have several functions, such as causing the compositions to be easily dispersed or emulsified in water to give aqueous sprays (which for the most part constitute desirable media for most applications) or assist in wetting the surfaces of the soil or undesired plants to which the formulation is applied. The organic surface active agents employed can be of the anionic, cationic or nonionic type. Generally, the surface active agents will be present only in minor proportion of the formulation, for example, less than 15% and frequently as low as 0.1% by weight of the composition. Usually, concentrations of from 0.5 to 10% are found to be most useful.

Thus, the active compound can be incorporated into absorbent materials such as clays, fuller's earth and the like, together with wetting agents such as sodium alkyl naphthalene sulfonates and dispersing agents such as the sodium lignin sulfonates to produce a water-dispersible powder concentrate which can be suspended in water and sprayed onto the soil so as to provide a concentration of 0.5–25 lb. of active herbicide per acre. Emulsifiable herbicidal concentrates of the active compound can likewise be formulated, for example, using kerosene or xylene or toluene or a high aromatic naphtha as solvent, together with an emulsifying agent which may be of the nonionic type, e.g. octyl- or nonylphenol-ethylene oxide condensates, or, more preferably, blends of nonionic type surface active agents with oil soluble anionic surface active agents, such as the calcium salt of an aryl alkyl sulfonate. A blend known as "Emcol H500X" gives particularly good results.

Examples of herbicidal concentrates formulated in accordance with the invention are as follows:

Dispersible powder concentrate, percent w./w.:
    Active compound _____ 40
    Belloid NW [1] _____ 1
    Lissatan AC [2] _____ 2
    Clay (kaolin) _____ 47
    Bentonite _____ 10
Emulsifiable concentrate, percent w./v.:
    Active compound _____ 40
    Emcol H500X [3] _____ 10
    Xylene to 100% by volume.

[1] Product of Geigy, Switzerland.
[2] Product of Imperial Chemical Industries, England.
[3] Product of Emulsol Corp., U.S.A.

These concentrates can be readily mixed with water as a carrier and sprayed onto weeds or the soil so as to provide a treatment of 0.5 to 25 lb. per acre.

We have established that for effective pre-emergent control of grasses, amounts within the range 1–60 lb./acre of active compound can be used with advantage. Examples of grasses which are controlled are wild oat, brome grass, rye grass, foxtail and crab grass, broadleaved plants including radish, sugar beet, cotton, pigweed, soya bean, wild buckwheat and tomato have been effected to varying degrees. At rates of application 25–100 lb. per acre, the active compound prevents almost all plant emergence.

The value of 2-trichloromethylbenzoxazole as a pre-emergent herbicide is exemplified by planting in aluminium pans (9½ x 5¼ x 2¼ inch) seeds of 17 different plants each representing a principal botanical type. A good grade of top soil screened through ½" wire mesh is compacted to a depth of ⅜" from the top of the pan. The grass seeds are scattered randomly over half of the soil surface and the broad leaved seeds are scattered randomly over the remaining soil surface.

The required weight of test compound for each rate of application tested was dissolved in acetone (15 cc.). Half of this quantity is then sprayed onto a measured amount of soil, the soil thoroughly mixed and the balance of the chemical sprayed over the surface. After another thorough mixing the treated soil is used to cover the seeds in the pan. After spraying, the pans are placed in ½ inch of water and allowed to absorb moisture through the perforated bottom until the soil surface is about half-moist. The pans are then transferred to a wet sand bench in a greenhouse.

Fourteen days after application of the test chemical, results are observed and recorded. The number of plants of each species which germinate are counted and converted to a herbicidal rating by means of a fixed scale based on average percent germination. Germination rates are established for all new seed lots and periodic checks are run on old seed in current use. Relative value of the test compound with respect to its herbicidal effect on each plant is indicated by a number, as follows:

0—No phytotoxicity
1—Slight toxicity
2—Moderate toxicity
3—Severe toxicity

The following table demonstrates the herbicidal effect of 2-trichloromethylbenzoxazole at a range of application rates against each of the species listed.

| Species | 25 lb. | 5 lb. | 5 lb.* |
|---|---|---|---|
| Morning Glory | 0 | 0 | 1 |
| Wild Oat | 3 | 3 | 3 |
| Brome Grass | 3 | 1 | 3 |
| Rye Grass | 3 | 1 | 3 |
| Radish | 1 | 0 | 2 |
| Sugar Beet | 0 | 0 | 2 |
| Cotton | | 2 | 2 |
| Corn | | 2 | 2 |
| Foxtail | 3 | 3 | 3 |
| Barnyard | | 1 | 1 |
| Crab Grass | 3 | 2 | 3 |
| Pig Weed | 2 | 2 | 3 |
| Soya Bean | 0 | 1 | 1 |
| Wild Buckwheat | 1 | 1 | 2 |
| Tomato | 0 | 1 | 3 |
| Sorghum | 3 | 2 | 3 |
| Rice | | 2 | 3 |

* Ratings made four weeks after treatment.

2-trichloromethylbenzoxazole may be prepared by reaction of o-aminophenol with chloral in the presence of an oxidizing agent such as lead tetraacetate. Alternatively, o-aminophenol may be reacted with an alkyl trichloroacetimidate.

What is claimed is:
1. Composition comprising a finely-divided solid, a surface-active agent and a herbicidal amount of 2-trichloromethylbenzoxazole.
2. Method of controlling the growth of plants which comprises contacting the soil prior to emergence of said plants from soil with a herbicidal amount of 2-trichloromethylbenzoxazole.
3. Method of claim 2 wherein the 2-trichloromethylbenzoxazole is applied at the rate of 0.5 to 25 lbs. per acre.
4. Method of controlling the growth of plants which comprises applying to plants a herbicidally effective amount of 2-trichloromethylbenzoxazole.
5. Method of claim 4 wherein the 2-trichloromethylbenzoxazole is applied at a rate of 0.5 to 25 lbs. per acre.

References Cited

UNITED STATES PATENTS

| | | | |
|---|---|---|---|
| 2,630,381 | 3/1953 | Schlesinger et al. | 71—88 |
| 3,244,722 | 4/1966 | Johnston et al. | 260—299.8 |
| 3,334,990 | 8/1967 | Schafer et al. | 71—88 |

OTHER REFERENCES

Stephens et al.: J. Chem. Soc., 1950, pp. 1722–1726.

LEWIS GOTTS, *Primary Examiner.*

M. M. KASSENOFF, *Assistant Examiner.*

U.S. Cl. X.R.

260—307